Jan. 26, 1943.   S. ALEXANDER   2,309,374
STEERING WHEEL COVER
Filed Nov. 12, 1940
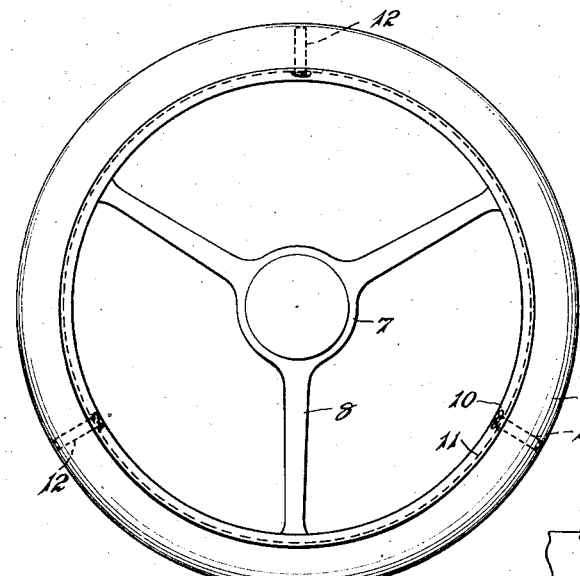
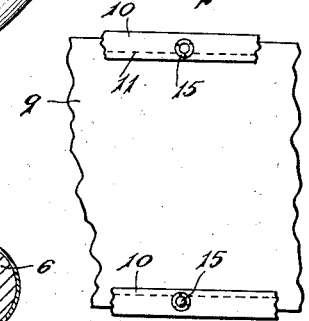
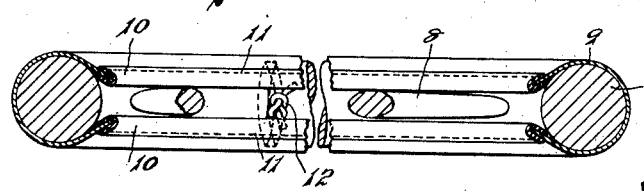
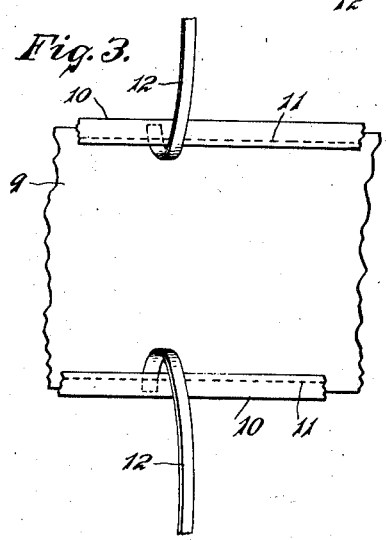
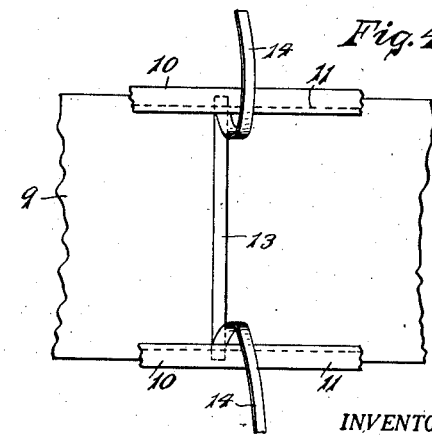
INVENTOR.
SAMUEL ALEXANDER.
BY Louis V. Lucia
ATTORNEY.

Patented Jan. 26, 1943

2,309,374

UNITED STATES PATENT OFFICE 2,309,374

STEERING WHEEL COVER

Samuel Alexander, Hartford, Conn.

Application November 12, 1940, Serial No. 365,291

4 Claims. (Cl. 74—558)

This invention relates to steering wheel covers and the primary object thereof is to provide an improved cover that is economical to produce and neat in appearance.

A further object of this invention is to provide such a cover having means whereby the same may be secured to the steering wheel to prevent displacement or slippage thereof on said wheel.

A still further object, is to provide means for retaining the edges of the cover in close relation to the rim of the steering wheel.

The said objects, as well as others, and advantages of the present invention will be more clearly understood from the following description and from the accompanying drawing in which:

Fig. 1 is a top plan view of a steering wheel with my improved cover attached thereto.

Fig. 2 is an enlarged fragmentary view, in central vertical section, through the said steering wheel and cover.

Fig. 3 is an inside plan view of a portion of said cover, in open position, showing my improved securing means thereon.

Fig. 4 is a similar view illustrating a modified form of said securing means.

Fig. 5 is a similar view illustrating a further modification.

As shown in the drawing, the numeral 6 denotes the rim of a steering wheel of conventional form which is supported upon the hub 7 by means of spokes 8.

My improved cover 9 comprises a strip of fabric of a length sufficient to encircle the rim of the wheel and which is adapted to substantially enclose the said rim as clearly illustrated in Fig. 2.

The said strip is provided, at its edges, with elastic members 10—10, in the form of tapes, which are sewn over said edges by means of stitches 11, to enclose the marginal portion of said edges; the said tapes being doubled over said edges to prevent unravelling of the material and, at the same time, to present neatness in appearance.

The provision of such elastic tapes, to enclose the edges of the cover strip, is of particular advantage over the conventional construction of steering wheel covers wherein the edges of the cover strip are turned over, to enclose an elastic member, which causes a bulky thick edge without preventing unravelling of the material.

It is important, from the standpoint of safety, that said covers engage the steering wheel in such a manner that they will not slip thereon.

To prevent said slippage, tie ribbons 12—12 are sewn to the cover, preferably with the tapes 10 and by the same stitches 11 as clearly illustrated in Fig. 3.

In the form illustrated in Fig. 4, the tie ribbons 13 may extend across the cover strip and be doubled over under the tapes and sewn to said edges in the same manner as the ribbon 12; the ends 14 of said ribbon 13 being free to permit tying.

When the cover is attached to the rim of the steering wheel, the said tie ribbons may be wrapped around the rim 6 and tied thereto, as clearly illustrated in Fig. 2, thus preventing displacement or slippage of the cover on the steering wheel rim and, at the same time, pulling the edges of the cover inwardly upon the rim, as illustrated in Fig. 2, to present neatness in appearance and also to confine the size of the said cover closely to that of the steering wheel rim. If desired, the said tie ribbons may be wrapped around and tied to the spokes 8 of the wheel, instead of to the rim.

In the modified form shown in Fig. 5, the cover securing means may be in the form of suitable snap fasteners 15, which interengage to secure the cover firmly around the rim of the steering wheel.

It will be clearly understood that, by this invention, I have provided a novel steering wheel cover which will provide the advantages above pointed out. In addition thereto, my invention will permit economy in the use of the material for said cover for the reason that, by the use of the elastic members 10, a narrower strip may be used since the edges thereof need not be turned over to enclose an elastic member as has been done in the conventional forms of such covers.

I claim:

1. A steering wheel cover of the character described comprising a ring formed from a U-shaped strip of flexible material, elastic means secured along the opposite edges of said strip for drawing said cover over the rim of said wheel, and means including spaced pairs of members sewed to the inside of said ring adjacent the edges thereof and adapted to secure said ring to said wheel to prevent displacement of said cover on said rim.

2. A steering wheel cover of the character described comprising a U-shaped strip of flexible material having elastic members enclosing the opposite edge portions thereof, stitches extending through said members and strip, and tie means including a member sewn to the inside of said strip by said stitches.

3. A steering wheel cover of the character described comprising a cover strip of flexible material having an elastic member enclosing the marginal edge portion thereof, a tie member comprising a flexible strip and having an end thereof disposed between said elastic member and cover strip, and a row of stitches extending through said elastic strip, tie member and cover strip for securing said tie member and elastic strip to said cover strip.

4. A steering wheel cover of the character described comprising a strip of flexible material, elastic members sewn to said strip along the opposite edges thereof and means including a ribbon extending across said strip and doubled under said elastic means and sewn therewith to said cover, said tie means being adapted to be tied to the rim or spokes of said wheel for retaining said cover against slippage thereon.

SAMUEL ALEXANDER.